Feb. 19, 1963 W. NEWMAN 3,078,331
JOINTING OF ELECTRIC CABLES
Filed April 29, 1960 3 Sheets-Sheet 1
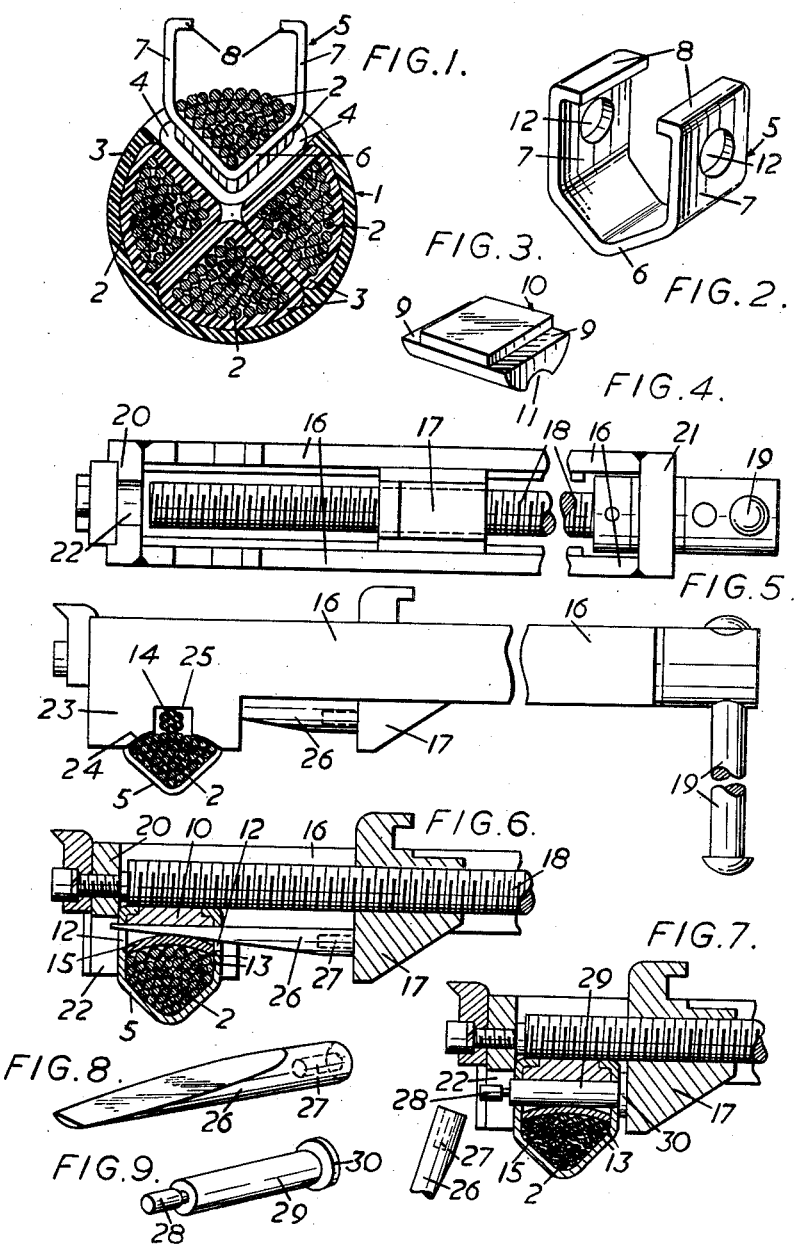
Inventor
Walter Newman
By
Watson, Cole, Grindle & Watson
Attorneys

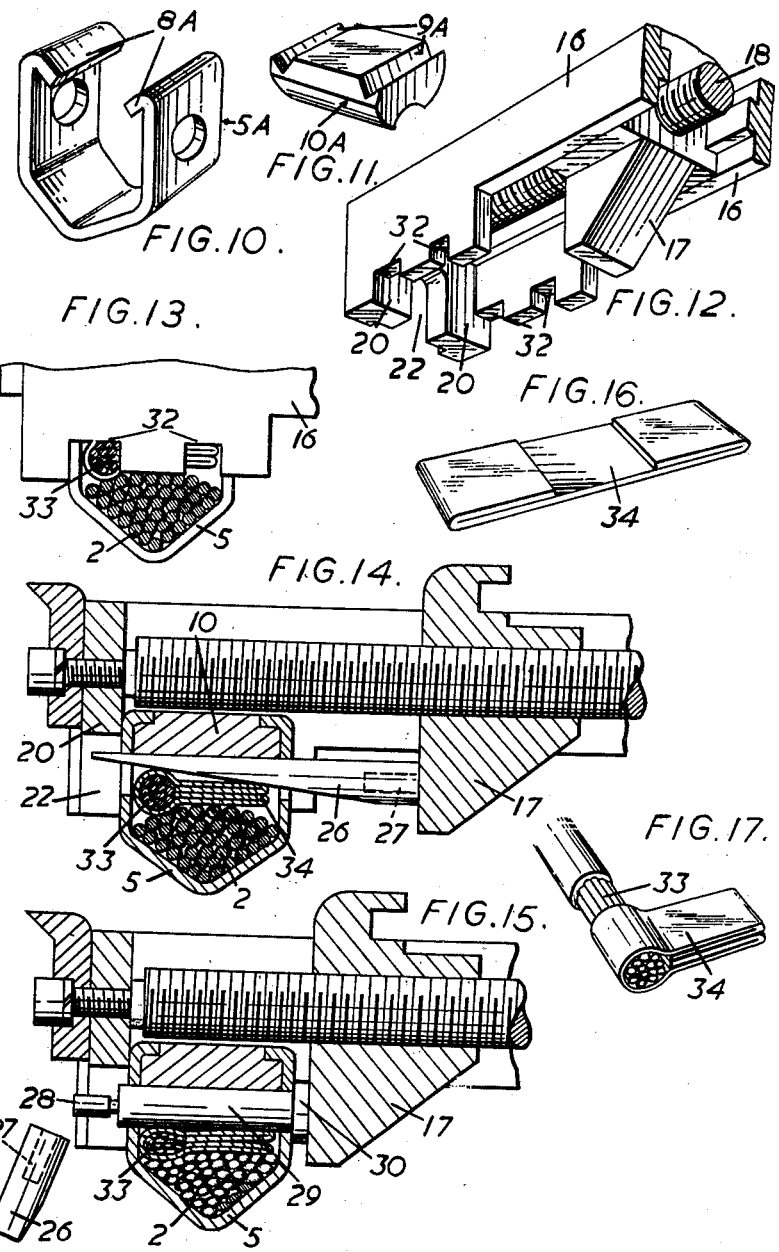

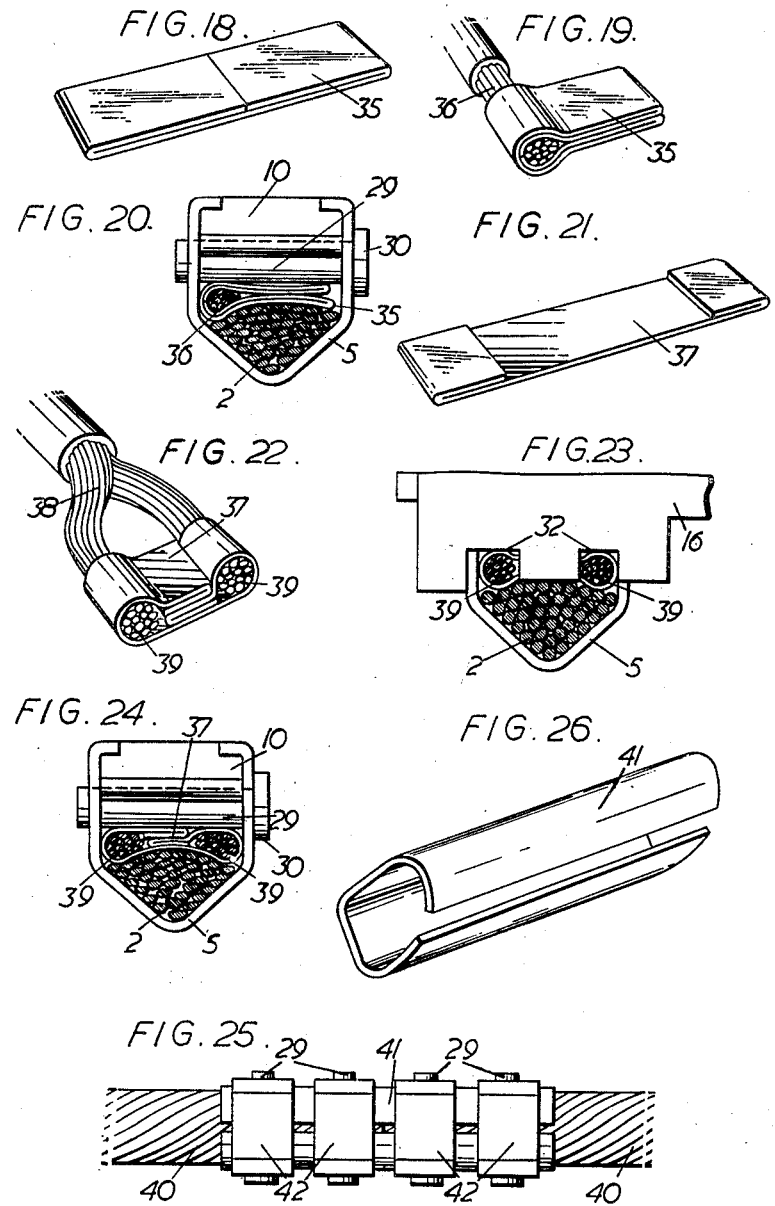

United States Patent Office 3,078,331
Patented Feb. 19, 1963

3,078,331
JOINTING OF ELECTRIC CABLES
Walter Newman, Hazlehead, near Sheffield, England, assignor to The Hepworth Iron Company Limited, Hazlehead, near Sheffield, England
Filed Apr. 29, 1960, Ser. No. 25,651
Claims priority, application Great Britain Aug. 6, 1959
8 Claims. (Cl. 174—84)

This invention relates to the jointing of electric cables, its object being to enable the conductors of electric cables to be joined with good electrical connection by mechanical means, without involving the use of heat, whether for the straight joining of two lengths of cable or the making of a service or branch joint with a distribution cable.

According to the present invention, a method of joining two electrical conductors comprises laying the two conductors side-by-side, applying round them a metallic yoke and a bridging member anchored by the ends of the arms of the yoke, and forcing a compression member through a hole in one arm of the yoke and between the bridging member and one of the conductors until it enters a hole in the other arm of the yoke to compress that conductor to the other conductor.

Initial compression may be effected by a tapered compression member, which serves as a wedge, with final compression effected by a parallel compression member. Advantageously, a tapered pin is used for the initial compression, with its thick end the same diameter as that of a parallel pin that effects the final compression.

In the case where a stranded branch conductor is to be joined to a cable, or one core of a cable, as the other conductor, the strands of the branch conductor may be spread over the surface of the other conductor, preferably with a packing piece covering them to receive the pressure of the compression member. Alternatively, the strands may be kept bunched and either contained in a metal ferrule or wrapped in a metal tag that extends over the surface of the other conductor and also receives the pressure of the compression member. If the size of the branch conductor warrants it, its strands may be formed into more than one bunch, to be enveloped by a metal tag. Such tag provides multiple thicknesses of metal, additional to the thickness of the branch conductor, sufficient to ensure a high degree of compression to the other conductor and the provision of good electrical continuity between the two conductors.

In the case of a straight joint between two cables, or two cable cores, these are laid end-to-end within a sleeve that constitutes the second conductor to be joined side-by-side to each of the cables, or cores, as the first conductor, the sleeve being compressed to each of these by means of a yoke, bridging member, and compression member, and itself providing electrical continuity between the two of them. The sleeve, whether of sheet metal, or of metal laminations, preferably soft copper, is preferably split lengthwise to facilitate its application round the conductors. However, a tube of metallic braid may be used.

The bridging member may be anchored by bearing on inturned ends of the arms of the yoke, and it may be recessed to receive those ends. The ends may form hooks to be received by appropriately shaped recesses. The bridging member forms a distance piece between the arms of the yoke, and is urged against the inturned ends by the compression member. A groove may be formed on the underside of the bridging member to guide the compression member across the yoke, from one hole to the other, and to locate the member in the joint.

It is preferred that separate tapered and parallel compression members be used, so that only the latter remains as part of the completed joint, to leave the latter compact, particularly if it has to be enclosed in insulation. The parallel compression member may serve to force the tapered compression member out of the yoke. The tapered member may have a socket to receive a spigot on the parallel compression member. The parallel compression member preferably has a head that bears on one arm of the yoke when the member is in final position in the joint.

For use in making joints to single cores of 4-core or 3-core cables, the bight of the yoke is appropriately shaped to fit the two inner surfaces of a core, and the width of the yoke is such that the core is closely embraced by the arms of the yoke.

By means of the invention, a good electrical joint can be made by the exertion of mechanical pressure. It is thus not necessary to subject the cables to heat, as is the case with sweated joints. This is of great advantage in jointing plastic insulated cables, but the invention is applicable to cables in general, including cables with copper and aluminum conductors, and paper-insulated cables.

The joint is easy to make, even in a confined space, since the parts of the yoke through which the compression member has to be forced can be easily reached even though it lies close alongside the conductors, and the forcing of the compression member into the yoke can easily be effected by simple tools, capable of being applied close to the conductors.

It is a great advantage of the invention that the contact pressure between the two lengths of cable is largely determined by the dimensions of the yoke, bridging member, and compression member, with a packing piece or tag to provide extra thickness of metal if required. Provided the correct type and size of fitting be used, the pressure is not dependent on the operator who simply has to ensure that the compression member is driven to its final position in the joint. Consequently, the finished joint fulfils the necessary electrical and mechanical requirements for trouble-free service after being insulated and buried. The yoke can be inserted with only very small separation of the cores of a cable, and the final joint adds very little bulk, so that application of insulation before burying offers no difficulty.

The invention includes the yokes, bridging members, compression members, and other fittings required in the making of the joints. Several examples of these, and methods for applying them, are described in the following description with reference to the accompanying drawings, in which FIGURE 1 is a section through a 4-core cable with one core conductor ready to have another conductor joined to it with the aid of a clip-yoke;

FIGURE 2 is a perspective view of the clip-yoke shown in FIGURE 1;

FIGURE 3 is a perspective view of a bridging member to be fitted between the arms of the clip-yoke;

FIGURE 4 is an underneath plan of a tool for use in applying the complete clip;

FIGURE 5 is a side view of the tool shown in one stage of applying the clip to a conductor as in FIGURE 1;

FIGURE 6 is a longitudinal section of the left-hand part of FIGURE 5;

FIGURE 7 corresponds to FIGURE 6, but shows the completion of a final step in the application of the clip;

FIGURES 8 and 9 are perspective views of respectively a tapered wedge-pin seen in use in FIGURES 5 and 6 and a locking pin shown applied in FIGURE 7;

FIGURES 10 and 11 resemble FIGURES 2 and 3 but show respectively alternative forms of yoke and bridging member;

FIGURE 12 is a perspective view from underneath of one end of a modified form of tool;

FIGURE 13 is a side view of the end of the tool of FIGURE 12, shown applied to a core conductor, with yoke-clip, and a conductor fitted with a tag;

FIGURE 14 is a longitudinal section of the end of the tool of FIGURE 12, showing a stage corresponding to that of FIGURE 6 but in the formation of a modified joint;

FIGURE 15 corresponds to FIGURE 14, but shows the completion of the final step (corresponding to that of FIGURE 7) of the formation of the modified joint;

FIGURE 16 is a perspective view of a terminal tag used in the modified joint;

FIGURE 17 is a perspective view of the tag of FIGURE 16 applied to a conductor to be joined to a core;

FIGURE 18 is a perspective view of another tag for use in a further modification of the joint;

FIGURE 19 is a perspective view of the tag of FIGURE 18 applied to a conductor to be joined to a core;

FIGURE 20 is a section of the conductor of FIGURE 19 completely joined to the core;

FIGURE 21 is a perspective view of a longer tag than the one shown in FIGURE 16;

FIGURE 22 is a perspective view of the tag of FIGURE 21 applied to a divided conductor;

FIGURE 23 corresponds to part of FIGURE 13, but shows the conductor as in FIGURE 22 located with respect to the core in the tool;

FIGURE 24 is a section of the conductor of FIGURE 22 when clipped to a core;

FIGURE 25 shows a straight joint between two cables effected by the use of several clips; and FIGURE 26 is a perspective view of a sleeve used in the joint of FIGURE 25.

In FIGURE 1, a 4-core cable 1 with its cores 2 separated by insulation 3 has one core stripped of insulation and drawn away from the two adjoining cores, to leave spaces 4 sufficient for the introduction of a metal yoke-clip 5. The bight 6 of the clip is shaped to fit the inner faces of the core 2, which are at right-angles to each other, and the arms 7 closely embrace the maximum width of the section of the core. The ends 8 of the arms 7 turn inwards to fit recesses 9 along the top side edges of a metal bridging member 10 (FIGURE 3) the underside of which has a concave groove 11 to register with the upper sides of holes 12 (FIGURE 2) in the arms 7 of the clip. For a 3-core cable, the bight 6 of the clip is shaped to fit the inner faces of a core, which are now at 120° to each other.

Before the bridging member 10 is inserted in the clip, the bared strands 13 (FIGURES 5 to 7) of the end of a conductor 14 to be joined to the core 2 are spread over the curved outer surface of the core and covered by a corresponding curved packing piece 15 of sheet metal e.g. of spring steel or soft copper (FIGURES 6 and 7). The bridging member 10 is now inserted and the tool of FIGURES 4 and 5 is applied to the clip 5.

The tool has spaced sides 16 with internal guides for movable jaw 17 operated by a screw 18, with handle 19, ending near a fixed jaw 20 at one end of the tool and journalled in a cross-member 21 at the other end. The jaw 20 has a central opening 22. The clip 5 fits between downward extensions 23 of the side plates 16, which have curved seats 24 to fit closely to the core 2 and a recess 25 for the conductor 14.

The movable jaw 17 is first withdrawn sufficiently for the introduction of a tapered wedge-pin 26 (FIGURE 8), the thin end of which is passed through one hole 12 in the clip 5 and along the groove 11 in the bridging member 10, the wedge thus passing between the bridging member and the packing piece 14. The jaw 17 is then used to press on the thick end of the wedge 26 to move the wedge and force the packing piece 14 away from the bridging member 10, so that the strands 13 of the conductor are compressed to the bare strands of the core 2 over the outer curved surface of the latter. The thin edge of the wedge 26 passes through the other hole 12 in the clip 5 and through the opening 22 of the fixed jaw 20 (FIGURE 6).

The thick end of the wedge 26, which has the same diameter as the holes 12 in the clip 5, has an axial socket 27 to receive the reduced spigot end 28 of a cylindrical locking pin 29 (FIGURE 9), the other end of which has a head 30. The body of the locking pin 29 is also of the same diameter as the holes 12 in the clip 5. The movable jaw 17 is withdrawn, leaving the wedge 26 in the clip, to allow the pin 29 to be inserted, with its spigot 28 in the socket 27 in the wedge 26, and the jaw is then used to press the pin 29 between the bridging member 10 and the packing piece 14 until the pin passes through the farther hole 12 in the clip (FIGURE 7) to complete the compression of the packing piece 14 and the strand 13 to the core 2. The same operation releases the wedge 26.

Because the pin 29 is engaged by the holes 12 in the clip and the groove 11 in the bridging member 10 on one side, and on the other by the packing piece 14, now tightly compressed with the strands 13 of the conductor to the core 2 of the cable, it is retained by a high degree of friction. If desired, a washer could be placed on the protruding end 28 of the pin, and the end then riveted over, or the end 28 could be a screw to receive a safety nut. However, the pressure on the pin 29 is generally such that it is firmly held purely by friction, and the spigot 28 may be broken away from the pin, a groove 31 being provided to facilitate this.

The bridging member 10 acts as a distance piece between the arms 7 of the clip 5, and is retained in position by the pressure of the pin 29 and the counter-pressure of the inturned ends 8 of the arms 7 of the clip 5. It is retained in place by the engagement of the pin 29 with its groove 11. FIGURE 10 shows a clip 5A with the inturned ends 8A of its arms bent down to form hooks, to engage V-recesses 9A in a bridging member 10A (FIGURE 11). These modified members 5A, 10A resist spreading of the arms of the yoke in cases where particularly heavy pressure must be applied by the locking pin.

The mechanical joint thus produced is also a very good and permanent electrical joint, which can then be insulated and enclosed in any suitable joint box.

FIGURE 12 shows the end of a tool similar to that of FIGURE 5, but whereas in FIGURE 5 the side extensions 23 near the fixed jaw 20 to provide the curved seats 24 conforming to the curvature of the core 2, and have central recesses 25, in FIGURE 12 each extension has two notches 32, for a purpose to be described below. Otherwise, as shown by FIGURES 14 and 15, the tool of FIGURE 12 is used in a manner very similar to that of FIGURE 5. FIGURE 13 shows a conductor 33 to be joined to a core 2, but instead of the strands of the conductor being spread over the outer surface of the core, they are kept bunched and wrapped in a tag 34, formed from a strip of metal, e.g. copper or tinned copper, with its ends folded over (FIGURE 16) and then folded round the conductor to provide four thicknesses of strip metal alongside the conductor 33 (FIGURE 17). The conductor 33 passes through one of the notches 32 nearer the fixed jaw 20, and the 4-fold thickness of the tag 34 extends over the curved surface of the core 2 (FIGURE 13). The wedge-pin 26 is inserted over the tag and the conductor and between these and the bridging member 10 (FIGURE 14), so that the conductor and the tag are compressed to the core. When in turn the locking pin 29 is inserted (FIGURE 15), the compression of the conductor and the tag to the core 2 is completed, and electrical conduction is provided over the whole area of contact between the tag 34 and the core 2.

Instead of the tag 34, a metal ferrule may be placed round the conductor 33, the ferrule and the conductor being deformed by the wedge 26 and the pin 29 into intimate contact with the core 2.

FIGURE 18 shows a tag strip 35 folded double over its whole length, so that two thicknesses pass round a conductor 36 (FIGURE 19), as may be desirable when the conductor is rather slender, the extra thickness of tag ensuring the necessary compression to the core (FIGURE 20).

FIGURE 21 shows a longer tag strip 37 for use when a thicker conductor 38 needs to be formed into two bunches 39 (FIGURE 22), the folded ends of the tag lying between the bunches to provide altogether five thicknesses of metal between the bunches. As shown by FIGURE 23, both notches 32 are used to locate the bunches 39 in the tool. FIGURE 24 shows the joint completed by the insertion of the locking pin 29.

If desired, more than one clip may be applied in the making of a branch joint between a core and a branch conductor. Similarly, more than one clip may be used in making a straight joint between two cables or two cable cores, as is shown by FIGURE 25. Two bared end-lengths of cables or cable-cores 40 to be joined are laid end-to-end and enveloped in a split metal sleeve 41 (FIGURE 26), and the sleeve is compressed in each of several clips 42 between the yoke bases of the clips and the locking pins 29, with the strands of the cables compressed inside the sleeve. The thickness of metal, e.g., soft copper, in the sleeve is such as to provide full electrical continuity from one conductor to the other. This thickness may also be provided by a laminated sleeve, or by metallic braiding, either of which can be compressed into more intimate contact with conductors than a sheet-metal sleeve.

What I claim is:

1. A method of joining two eelctrical conductors comprising laying the conductors side-by-side, applying round them a metallic yoke with the ends of its arms spaced apart, together with a bridging member anchored by the ends of the arms of the yoke, the arms having aligned holes, and compressing the conductors together by forcing a compression member through the hole in one arm and between the bridging member and one of the conductors until it also enters the hole in the other arm, said method including the steps of effecting initial compression by wedging action of a tapered compression member, and final compression by a parallel compression member, the parallel member being used to force the tapered member out of the yoke and taking the place of the tapered member in the yoke.

2. A method as in claim 1, further comprising the step of surrounding one of the conductors with a metal tag, which is compressed with that conductor to the other conductor.

3. A method of joining two electrical conductors placed end-to-end, comprising surrounding the conductors by a conducting sleeve, applying round each conductor and the surrounding sleeve a metallic yoke with the ends of its arms spaced apart, together with a bridging member anchored by the ends of the arms of the yoke, the arms having aligned holes, and compressing the sleeve and that conductor together by forcing a compression member through the hole in one arm and between the bridging member and one of the conductors until it also enters the hole in the other arm.

4. A cable-jointing clip comprising a two-armed metallic yoke with aligned holes through its arms, a bridging member making anchoring engagement with and across the ends of the arms, and a compression member inserted through the holes and between the bridging member and the space between the yoke arms occupied by the cables which are joined together.

5. A cable-jointing clip comprising a two-armed metallic yoke with aligned holes through its arms, the ends of the arms being inturned, a bridging member between the arms and engaged by the inturned ends, and a compression member inserted through the holes and along the bridging member on the side of the latter opposite that engaged by the inturned ends.

6. A cable-jointing clip as in claim 5, wherein the bridging member is grooved to receive the compression member.

7. A cable-jointing clip as in claim 5, wherein the ends of the bridging member are recessed to receive the inturned ends of the arms of the yoke.

8. A cable-jointing clip as in claim 5, wherein the ends of the bridging member have V-recesses and the inturned ends of the arms of the yoke are bent into hooks to fit the V-recesses.

References Cited in the file of this patent

UNITED STATES PATENTS

| 2,296,227 | Varga | Sept. 15, 1942 |

FOREIGN PATENTS

| 267,510 | Switzerland | June 16, 1950 |
| 292,214 | Switzerland | Jan. 4, 1954 |